(12) United States Patent
Gardner

(10) Patent No.: US 6,544,449 B1
(45) Date of Patent: Apr. 8, 2003

(54) PROCESS FOR MAKING DECORATIVE AUTOMOTIVE INTERIOR TRIM ARTICLES WITH INTEGRAL IN-MOLD COATED POLYURETHANE AROMATIC ELASTOMER COVERING

(75) Inventor: John A. Gardner, Deerfield, NH (US)

(73) Assignee: Magna Interior Systems Inc., Aurora (CA)

( * ) Notice: Subject to any disclaimer, the term of this patent is extended or adjusted under 35 U.S.C. 154(b) by 0 days.

(21) Appl. No.: 09/316,149

(22) Filed: May 21, 1999

Related U.S. Application Data

(60) Provisional application No. 60/086,593, filed on May 22, 1998.

(51) Int. Cl.$^7$ ............................ B29C 44/06; B29C 41/08
(52) U.S. Cl. ...................... 264/46.5; 264/46.4; 264/255; 264/309; 264/338
(58) Field of Search .................. 264/46.4, 46.5, 264/255, 309, 338

(56) References Cited

U.S. PATENT DOCUMENTS

| | | |
|---|---|---|
| 1,889,905 A | 12/1932 | Saeger |
| 4,195,148 A | 3/1980 | Hagen |
| T100,701 I4 | 6/1981 | Kuehn |
| 4,285,897 A | 8/1981 | Zakaria et al. |
| 4,294,880 A | 10/1981 | Nishida ..................... 428/315 |
| 4,312,672 A | 1/1982 | Blahak et al. |
| 4,350,777 A | 9/1982 | Henrichs et al. |

(List continued on next page.)

FOREIGN PATENT DOCUMENTS

| | | |
|---|---|---|
| EP | 0379246 | 7/1990 |
| EP | 0392285 | 10/1990 |
| EP | 0425240 | 5/1991 |
| EP | 0744264 | 11/1996 |
| GB | 2079667 | 1/1982 |
| SU | 383608 | 3/1973 |
| WO | 880087 | 2/1988 |
| WO | 9323237 | 11/1993 |
| WO | 9510633 | 4/1995 |
| WO | 9532850 | 12/1995 |
| WO | WO 98/33634 | 8/1998 |

OTHER PUBLICATIONS

Titan Finishes Corporation, "Protothane WR" product literature (Aug. 7, 1997).
Patent Abstracts of Japan vol. 96, No. 7, Mar. 1996 re JP–08–071177.
"Elastogran France: Nouveau Procede Pour les Panneaux de Portes", Ingenieurs de L'Automobile, No. 676, Oct. 1, 1992, p. 63.

*Primary Examiner*—Allan R. Kuhns
(74) *Attorney, Agent, or Firm*—Rader, Fishman & Grauer PLLC

(57) ABSTRACT

A panel structure mountable in a vehicle to form a part of the interior thereof, and a process for making the same. According to this process, an outer layer defining at least a portion of the exposed exterior surface of the structure is prepared by applying a water-dispersed thermoplastic polyurethane composition and a light-stable, blocked, heat-activated diisocyanate onto a mold surface and thereafter drying the composition. Next, a rapidly reacting composition is sprayed onto an inner surface of the outer layer while the outer layer is retained on the mold surface to form a polyurethane elastomer inner layer that is interfacially chemical bonded to the outer layer. The inner layer with the outer layer interfacially chemically bonded thereto is then united with the reinforcing substrate so that the reinforcing substrate serves to reinforce the outer layer. The exposed exterior surface of the panel structure simulates the appearance and feel of authentic leather, while the inner layer and an optional semi-rigid polyurethane cellular foam intermediate layer provide a compressing feel to the exposed portion of the outer layer.

19 Claims, 6 Drawing Sheets

U.S. PATENT DOCUMENTS

| | | | |
|---|---|---|---|
| 4,389,454 A | 6/1983 | Horacek et al. | 428/318.6 |
| 4,520,042 A | 5/1985 | Smith | |
| 4,592,887 A | 6/1986 | Bando et al. | |
| 4,668,460 A | 5/1987 | Ongena | |
| 4,822,549 A | 4/1989 | Verwilst et al. | |
| 4,825,974 A | 5/1989 | Hoffmann et al. | |
| 4,873,049 A * | 10/1989 | Landwehr et al. | 264/513 |
| 5,051,310 A | 9/1991 | Horn et al. | 428/423 |
| 5,071,683 A | 12/1991 | Verwilst et al. | |
| 5,082,609 A | 1/1992 | Rohrlach et al. | |
| 5,115,048 A | 5/1992 | Maeda et al. | |
| 5,116,557 A | 5/1992 | Debaes et al. | 264/46.6 |
| 5,130,402 A | 7/1992 | Akiyama et al. | |
| 5,154,871 A | 10/1992 | Wagner et al. | |
| 5,207,961 A | 5/1993 | Wank et al. | |
| 5,223,193 A | 6/1993 | Bianchin et al. | |
| 5,284,918 A | 2/1994 | Huynh-Tran et al. | |
| 5,338,788 A | 8/1994 | Miyataka et al. | |
| 5,387,390 A | 2/1995 | Kornylo | |
| 5,387,750 A | 2/1995 | Chiang | |
| 5,397,409 A | 3/1995 | Kornylo | |
| 5,523,337 A | 6/1996 | Banerjee et al. | |
| 5,580,501 A | 12/1996 | Gallagher et al. | |
| 5,662,996 A | 9/1997 | Jourquin et al. | |
| 5,885,662 A | 3/1999 | Gardner, Jr. | |
| 6,013,210 A * | 1/2000 | Gardner, Jr. | 264/40.1 |
| 6,210,614 B1 * | 4/2001 | Gardner, Jr. et al. | 264/46.5 |

* cited by examiner

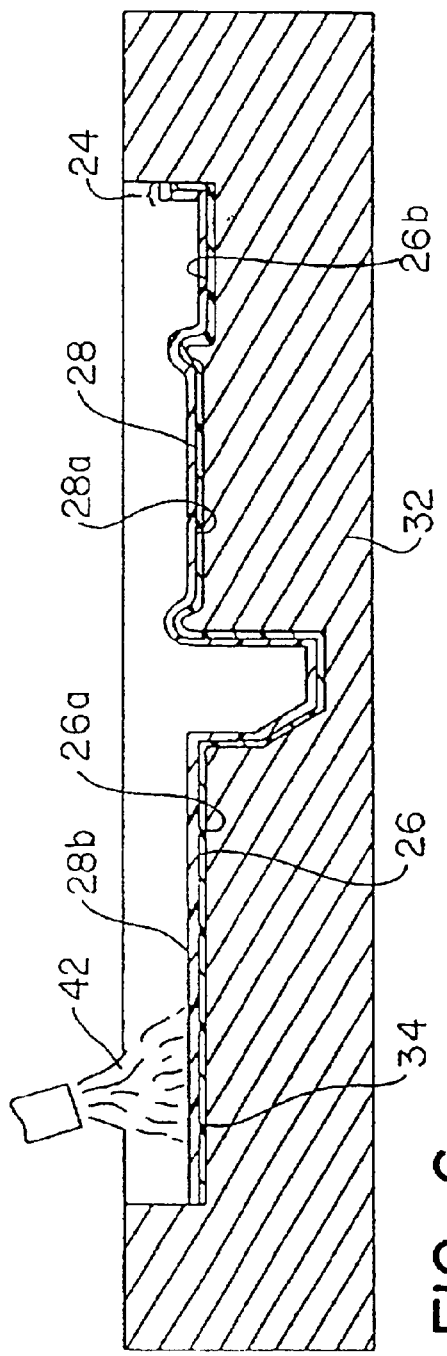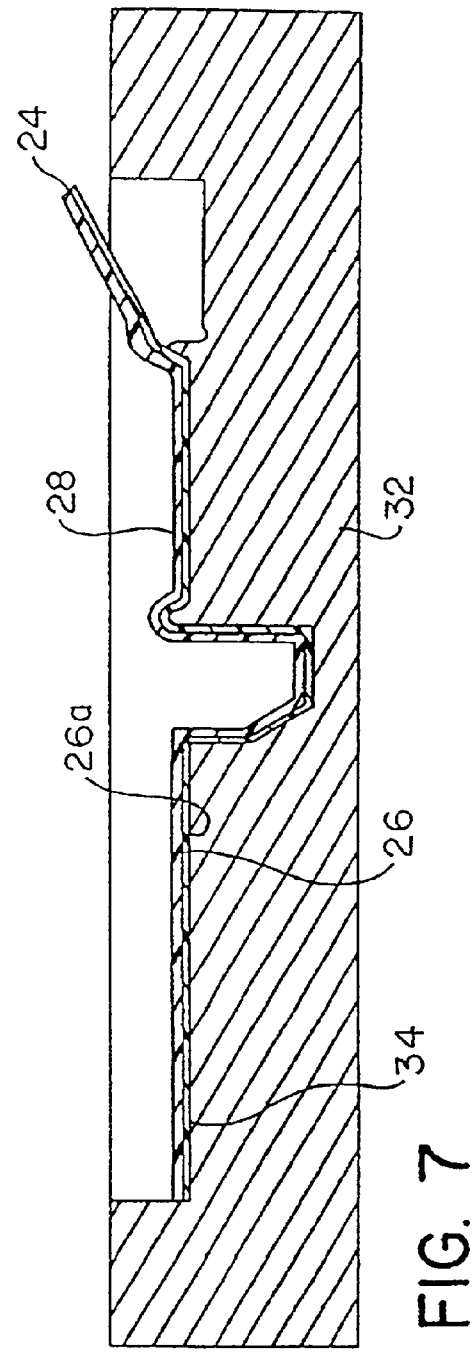

PROCESS FOR MAKING DECORATIVE AUTOMOTIVE INTERIOR TRIM ARTICLES WITH INTEGRAL IN-MOLD COATED POLYURETHANE AROMATIC ELASTOMER COVERING

Priority is claimed on provisional application 60/086, 593, which was filed in the U.S. Patent & Trademark Office on May 22, 1998, the complete disclosure of which is incorporated herein by reference.

BACKGROUND OF THE INVENTION

1. Field of Invention

This invention relates to automotive interior trim articles containing a panel structure mountable in an automobile vehicle to form a part of the interior thereof, and in particular to automobile interior trim articles such as instrument panels, door panels, and glove compartment doors. This invention further relates to a process for making automotive interior trim articles.

2. Description of Related Art

Automotive interior trim articles such as instrument panels, door panels, armrests, headrests, floor consoles, knee bolsters, and glove compartment doors conventionally have been constructed by applying a soft decorative covering over a rigid substrate mountable in an automobile vehicular body, with a cellular polyurethane padding interposed between the decorative covering and rigid substrate. A predetermined texture and color is usually provided to the decorative covering in an effort to simulate the appearance and feel of authentic leather.

The preparation of a self-supporting synthetic automotive interior trim article having a dual layer decorative covering is disclosed in U.S. Pat. No. 5,662,996 (corresponding to WO 93/23237), and in particular at Example 2 thereof. In accordance with the method disclosed in the Recticel '996 patent for preparing this interior trim article, a solvent-based polyurethane lacquer is initially applied to an open mold surface as an "in-mold paint", and then is dried by evaporating off the solvent. A "skin" prepared from a two-part polyurethane elastomer is thereafter formed on the inner surface of the dried in-mold paint by employing specialized nozzles and application systems. In practice, suitable spray nozzles and systems that can be employed are disclosed in U.S. Pat. Nos. 5,028,006 and 5,071,683. Next, a polyurethane cellular foam layer is prepared by spraying a polyurethane reaction mixture against the polyurethane elastomer skin. Finally, a polyurethane or polyisocyanurate reaction mixture is applied against the opposing surface of the polyurethane cellular foam layer to obtain a rigid synthetic carrier.

It appears that the commercial merit of this related art dual layer covering containing the in-mold paint disclosed in the Recticel '996 patent, and the process for making the same, is negligible, as indicated by the current lack of commercial activity of this dual layer covering by Recticel. Recticel does not utilize an in-mold solvent-based lacquer in its own commercial activity. Recticel has even proscribed at least one of its customers from using its in-mold paint.

Further, the use of the solvent-based lacquer as the in-mold paint plagues the preparatory method disclosed in the Recticel '996 patent with several complications and inefficiencies. For example, these lacquers contain large amounts of atmosphere-polluting volatile organic compounds (VOCs). Due to the extremely flammable and explosive nature of VOCs, such lacquers are subject to strict governmental regulations. Compliance with these governmental regulations often requires additional and expensive equipment designed to ensure worker safety and to protect against environmental pollution. For example, manufacturing facilities equipped for handling such lacquers must include special spray equipment, separate and customized spraying zones, and air cleansing equipment. Workers must also dress in special protective and often bulky and cumbersome gear that is fire resistant and shields against exposure to noxious fumes.

A need therefore exists to provide a process for making a panel structure containing a multi-layered decorative covering in which the panel structure can be produced in a more environmentally-friendly, efficient, and cost effective manner, and in which the resulting panel structure still has a desired high quality, leather-like appearance.

SUMMARY OF THE INVENTION

It is, therefore, an object of the present invention to solve the aforementioned problems associated with the related art as well as the need expressed above. In accordance with the principles of the present invention, this object is attained by providing a process for making a panel structure mountable on an automobile vehicle to form a part of the vehicle interior. The panel structure comprises a layered composite structure and a reinforcing substrate, with the substrate being hidden from the vehicle interior when the panel structure is mounted in the automobile. The layered composite structure comprises an outer layer defining at least a portion of an at least partially-exposed exterior surface of the panel structure and an inner layer.

According to one embodiment of this process, at least the following steps are performed to prepare the panel structure. At least one water-dispersed composition comprising at least one light-stable thermoplastic polyurethane (preferably in the form of resin particles in a colloid solution dispersed in water) containing one or more pendent hydroxyl and/or carboxyl functional groups, at least one desired coloring agent, and at least one light-stable, blocked, heat-activated diisocyanate is applied onto a heated mold surface shaped to define a complementary configuration to the outer layer. The light-stable thermoplastic polyurethane and the blocked, heat-activated diisocyanate are heated, preferably by preheating the mold surface, and reacted to induce crosslinking of the thermoplastic polyurethane with the blocked, heat-activated diisocyanate. Then, the water-dispersed composition is substantially dried while on the mold surface to coalesce the resin particles into a contiguous film and thereby form the exposed outer layer. Next, a rapidly reacting composition containing at least one aromatic polyisocyanate and at least one polyol is sprayed onto an inner surface of the outer layer while on the mold surface to form the inner layer comprising an aromatic polyurethane elastomer crosslinked with the polyurethane of the outer layer via residual unreacted functional groups of the blocked, heat-activated diisocyanate in the outer layer. Consequently, interfacial chemical bonding is obtained between the inner surface of the outer layer and an adjacent surface of the inner layer to form the layered composite structure. The layered composite structure is then united with the reinforcing substrate so that the reinforcing substrate serves to reinforce the outer layer. Optionally, a soft cellular polyurethane foam layer can be formed intermediate the inner layer and the reinforcing substrate. Consequently, the panel structure retains the touch, color and configuration of the exposed portion and the compressing feel provided to the outer layer by the inner layer and the optional soft cellular foam intermediate layer.

Another object of the present invention is the provision of an automotive interior trim article containing a panel structure made by the method of the present invention, and in particular the provision of a panel structure having an exterior surface which simulates the appearance and feel of authentic leather.

In accordance with the principles of the present invention, this object is attained by providing an article comprising a panel structure mountable in an automobile vehicle to form a part of the interior thereof. The panel structure has an exterior surface at least partially exposed to the vehicle interior and an interior surface which is hidden from the vehicle interior when the panel structure is mounted to the automobile vehicle structure. The panel structure comprises a reinforcing substrate and layered composite structure, with a soft cellular polyurethane foam layer optionally interposed therebetween. The reinforcing substrate has one surface defining the interior surface of the panel structure, and an opposite surface which is united to the layered composite structure. The layered composite structure comprises an outer layer and an inner layer. The outer layer defines at least a portion of the exposed exterior surface of the panel structure, and has the desired touch, color, and configuration of the panel structure, as well as exhibiting good chemical resistance. The outer layer comprises a substantially dried, light-stable, crosslinked polyurethane formulated from a water-dispersed composition comprising at least one desired coloring agent, at least one light-stable thermoplastic polyurethane containing one or more pendent hydroxyl and/or carboxyl functional groups, and a light-stable, blocked, heat-activated diisocyanate cross-linker. The light-stable aliphatic thermoplastic polyurethane and the blocked, heat-activated diisocyanate are heated to thereby produce a crosslinking reaction and molded on a heated mold surface shaped to define a complementary configuration to the outer layer, and then are dried on the mold surface. The inner layer, which is thicker than the outer layer, comprises an aromatic polyurethane elastomer formulated from a rapidly reacting composition containing at least one aromatic polyisocyanate and at least one polyol. The blocked, heat-activated diisocyanate serves to crosslink the aromatic polyurethane elastomer with the light-stable polyurethane of the outer layer. Consequently, the inner layer has a surface adjacent to and interfacially chemically bonded with an inner surface of the outer layer. The interfacial chemical bonds are formed by spraying the rapidly reacting composition onto the inner surface of the outer layer while the outer layer is retained on the mold surface. The reinforcing substrate serves to reinforce the outer layer while retaining the touch and color of the exposed portion and the compressing feel provided to the outer layer by the inner layer and the optionally interposed soft cellular polyurethane foam.

The composite provided in accordance with this embodiment exhibits excellent chemical, scuff and mar resistance to external influences. These and other properties are further enhanced by the selection of an aromatic polyisocyanate, as opposed to an aliphatic polyisocyanate, for making the polyurethane inner layer. Physical properties exhibited by and the processability of aromatic-based elastomers exceed those of aliphatic-based elastomers in several categories that are crucial in the automobile industry. For example, the improved processability of the aromatic-based elastomers is manifested by their better sprayability, reduced run-back, faster cure rates and demolding times, excellent handling, fewer pin holes, and more uniform thicknesses. The aromatic-based elastomers also exhibit higher tensile and tear strengths, better elongation and "cold flex" capability, and lower cost than their aliphatic-based counterparts. These characteristics translate into faster production times and higher quality products than could be attained with aliphatic-based elastomers. Moreover, concerns over the aromatic-based elastomer becoming less stable after prolonged exposure to light are obviated, since the light-stable polyurethane outer layer masks the aromatic-based elastomer from direct exposure to sunlight.

Further, appropriate additives can be introduced into the composite to provide the composite with the non-reflective and low gloss surface appearance desired for such panel structures. Furthermore, both the inner and outer layers of the composite are characterized by excellent extensibility, such that the composite can withstand indentation and flexure during use without causing cracking in the outer layer over a wide temperature range, such as from −30° C. to 120° C.

The principles of the present invention enunciated above are applicable to all types of panel structures, but have particular applicability to instrument panels (also referred to as dashboards) and door panels. Moreover, the principles of the present invention are applicable to various types of vehicles, including passenger cars, trucks, vans, utility vehicles, and others.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings:

FIG. 6 is a sectional view similar to FIG. 5 showing a step of obtaining an inner layer, and hence a layered composite structure, by spraying a rapidly reacting composition onto an inner surface of the outer layer while the outer layer is retained on the mold surface;

FIG. 7 is a sectional view similar to FIG. 6 showing a step of removing the layered composite structure from the mold surface;

DETAILED DESCRIPTION OF THE INVENTION

Figure 1:
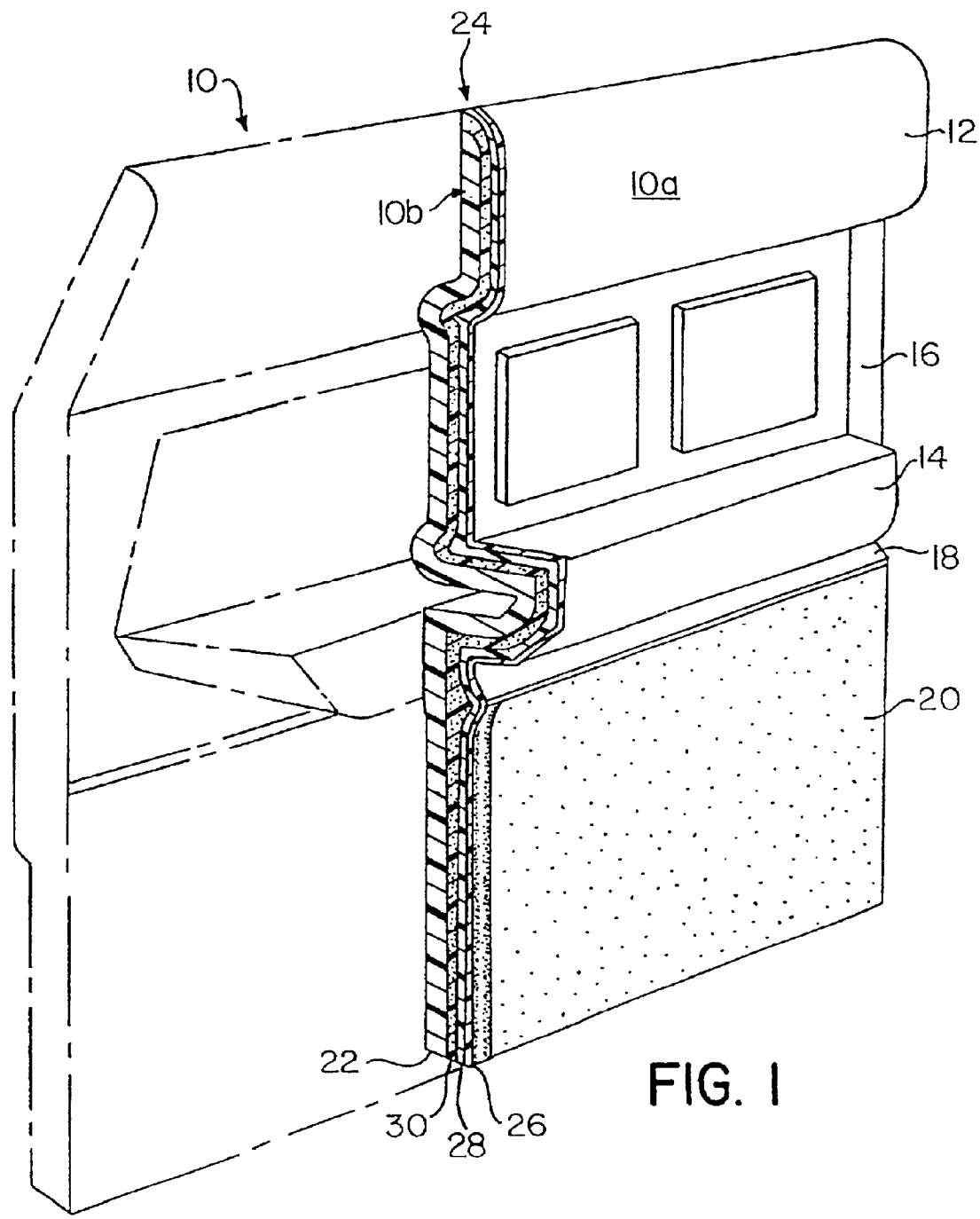
FIG. 1 is a perspective, partially sectioned and partially phantomed view of a completed vehicle door panel constructed in accordance with the present invention.

Referring now more particularly to the drawings, there is shown in FIG. 1 a panel structure comprising a vehicle door panel, generally designated by reference numeral 10, made by a method according to the principles of the present invention. The door panel 10 includes a window sill upper portion 12 and an arm rest portion 14 defining therebetween a bolster receiving portion 16. A lower planar rug receiving portion 18 having a rug section 20 connected thereto is disposed below the arm rest portion 14.

As shown in cross-section in FIG. 1, the panel structure 10 has an exterior surface 10a exposed to the vehicle interior and an interior surface 10b which is hidden from the vehicle interior when the panel structure 10 is mounted in the automobile vehicle. The panel structure 10 includes a reinforcing (or rigid) substrate 22 having one surface defining the interior surface 10b of the panel structure 10. The panel structure 10 further includes a layered composite structure, generally designated by reference numeral 24, comprising an outer layer 26 defining at least a portion of the exposed exterior surface 10a of the panel structure 10 and an inner layer 28. At least a portion of the outer layer 26 is exposed to the vehicle interior, while a portion of the outer layer may be hidden from view by a decorative or other masking item. For example, in FIG. 1, the lower planar rug receiving portion 18 of the outer layer 26 is covered by the rug section 20 and, therefore, is not exposed to the vehicle interior.

As illustrated in FIG. 1, the inner layer 28, which is relatively thick in comparison to the outer layer 26, has an outer surface 28a (FIG. 6) adjacent to and interfacially chemically bonded with an inner surface 26b (FIGS. 5 and 6) of the outer layer 26. As further illustrated in FIG. 1, the substrate 22, which is hidden from the vehicle interior when the panel structure 10 is mounted in the automobile vehicle, reinforces the outer and inner layers 26 and 28. Finally, an intermediate layer 30 containing a relatively rigid (or semi-rigid) polyurethane cellular foam filler is interposed between the inner layer 28 and the rigid substrate 22. The reinforced substrate 22 should have sufficient strength to reinforce and mount the outer layer 26, inner layer 28, and intermediate layer 30, and should have sufficient rigidity to permit the composite to be mounted into a vehicular sub-structure.

Figure 4:
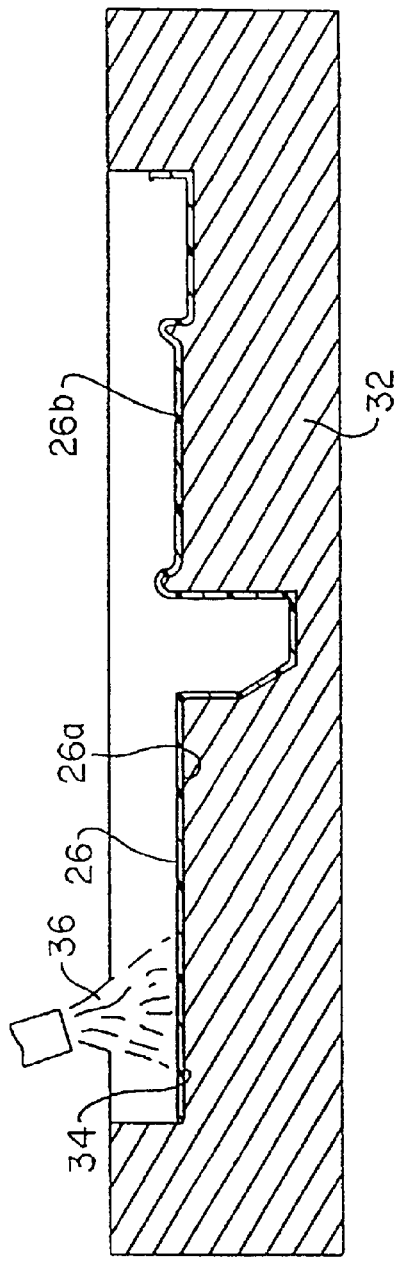
FIG. 4 is a sectional view of a mold surface showing a step of applying a water-dispersed polyurethane composition to the mold surface while heated to form a crosslinked light-stable polyurethane outer layer in accordance with the present invention.

As shown in FIG. 4, the method of the present invention utilizes a first mold component or part 32 having a first mold surface 34. The first mold component 32 preferably is formulated by electrolytically depositing nickel over a rigid cast epoxy substrate which is secondarily removed at the end of the deposition/plating process to yield a self-supporting mold capable of being mounted and controlled in a tooling module. The first mold surface 34 is shaped to define a configuration that substantially complements to the desired configuration of the outer layer 26, and is grained to define a texture that substantially complements the desired texture of the outer layer 26 and simulates real leather.

FIG. 4 illustrates the first step in the present invention and, in accordance with this step, the outer layer 26 is obtained by applying, preferably by spraying, a water-dispersed composition 36 onto the first mold surface 34. The water-dispersed composition comprises at least one light-stable aliphatic thermoplastic polyurethane containing one or more pendent hydroxyl and/or carboxyl functional groups, at least one desired coloring agent, and at least one blocked, heat-activated (preferably aliphatic) diisocyanate.

Application of the water-dispersed composition 36 onto the heated first mold surface 34 induces chemical reaction between the one or more pendent hydroxyl and/or carboxyl functional groups of the light-stable thermoplastic polyurethane and the blocked, heat-activated aliphatic diisocyanate to thereby produce a crosslinked light-stable polyurethane. The first mold surface 34 should be heated to a sufficient temperature to drive the crosslinking reaction, but should not be so high as to cause delamination of the composition 36 from the mold surface 34. Preferably, the first mold surface 34 is heated to a temperature in a range of from about 60° C. (140° F.) to about 71.1° C. (160° F.). The heating of the first mold surface 34 to such elevated temperatures prior to application of the water-dispersed composition 36 thereto also serves to melt and disperse semi-permanent mold releasing agents, such as microcrystalline wax mold releasing agents, applied to the first mold surface 34. The heated mold surface thereby serves to evaporate the wax dispersants and leave a thin residue that does not collect in the intricate grain detail of the first mold surface 34.

The light-stable aliphatic thermoplastic polyurethane and the blocked, heat-activated aliphatic diisocyanate constituents can be stably premixed, and stored for prolonged periods of time at room temperature before application. The water-dispersed composition 36 may be formed from a colloid solution of resin particles, which is added to water to disperse the resin particles in the water.

Figure 5:
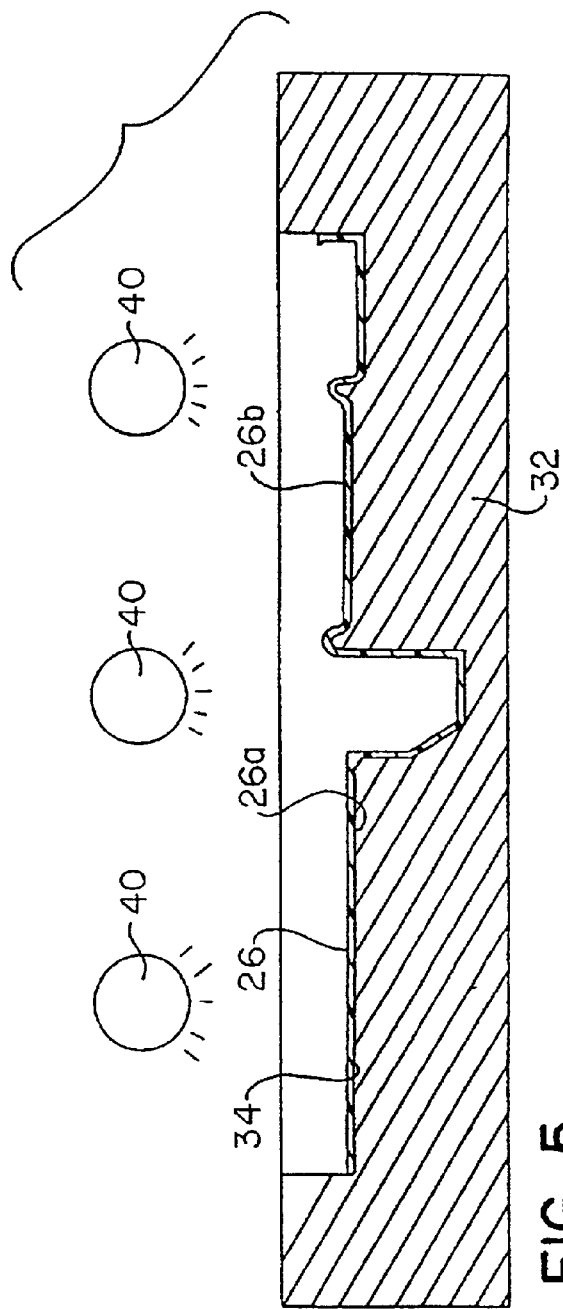
FIG. 5 is a sectional view similar to FIG. 4 showing a step of drying the polyurethane outer layer.

Once the crosslinked light-stable polyurethane has been formed on the first mold surface 34, it is substantially dried while being retained on the first mold surface 34 to obtain the outer layer 26. As shown in FIG. 5, the crosslinked light-stable polyurethane can be subjected to a heat source 40 to induce evaporation of the water and at least some of the solvent therefrom and coalesce the resin particles to thereby form the outer layer 26 with an outer surface 26a adjacent to the first mold surface 34. Although not shown in FIG. 5, such heat source 40 is preferably integrated with the first mold 32, and preferably heats the first mold surface 34 to an elevated temperature of about 65.9° C. (150° F.) or higher. At least a portion of the outer surface 26a of the outer layer 26 has the desired touch, color, and grain-like configuration of the panel structure 10.

Generally, the outer layer 26 has a thickness in a range of from about 0.0025 cm to about 0.0038 cm (that is, from about 1.0 mils to about 1.5 mils; or from about 0.001 inch to about 0.0015 inch).

The particular coloring agent selected can directly influence the desired thickness of the outer layer 26. Darker colors, such as grays and browns, usually only require a relatively small film thickness to mask the color of the hidden inner layer 28, whereas lighter colors such as reds and blues usually dictate the provision of a relatively larger thickness to obtain an opaque, non-transparent outer layer 26 that conceals the inner layer 28 from view and protects the inner layer from sunlight degradation.

Next, the polyurethane elastomer inner layer 28, as depicted in FIG. 6, is formed by spraying a rapidly reacting composition 42 onto the inner surface 26b of the outer layer 26 while the outer layer 26 is retained on the first mold surface 34 in a substantially dry state. The rapidly reacting composition 42 contains at least one aromatic polyisocyanate and at least one polyol, which react with each other to form the non-light-stable polyurethane elastomeric inner layer 28. As referred to herein, the term elastomer encompasses any resilient polymer composition stretchable under moderate tension and compressible and having a relatively high tensile strength and memory so that, upon release of the tension, the elastomer retracts into and recovers its original dimensions or dimensions substantially similar to its original dimensions.

In addition to being reactive with the polyisocyanate constituent, the polyol constituent of the rapidly reacting composition 42 can contain one or more pendent hydroxyl and/or carboxyl functional groups that are highly reactive with unreacted functional groups of blocked, heat-activated aliphatic diisocyanate in the outer layer 26 that have not reacted with the pendent functional groups of the polyurethane of the outer layer 26. Unreacted functional groups of the blocked, heat-activated aliphatic diisocyanate penetrate into the inner layer 28 and react with the pendent functional groups of the polyol constituent. As a result, the blocked, heat-activated aliphatic diisocyanate crosslinks the polyurethane of the outer layer 26 with the polyurethane elastomer of the inner layer 28 and thereby forms an interfacial chemical bond between the inner surface 26b of the outer layer 26 and the adjacent outer surface 28a of the inner layer 28. The layered composite structure 24 is thus obtained. If the crosslinking is performed under optimum crosslinking conditions, the boundary between the outer and inner layers 26 and 28 of the layered composite structure 24 can become visually indistinct, such that a transition phase appears at the interface of the two layers. As referred to herein, interfacial chemical bonding encompasses, but is not limited to, such crosslinking reactions in which the interfacing boundary between the outer and inner layers 26 and 28 is visually indistinct and inseparable.

Generally, provisions should be taken to ensure that an adequate interfacial chemical bond is achieved between the inner surface 26b of the outer layer 26 and the adjacent outer surface 28a of the inner layer 28. For example, once the blocked, heat-activated aliphatic diisocyanate is activated by heat, the crosslinking reaction between the heat-activated light-stable diisocyanate and the pendent hydroxyl and/or carboxyl reactive groups of the thermoplastic polyurethane goes to completion within minutes, leaving the heat-activated light-stable diisocyanate with substantially no residual reactive sites for crosslinking the polyurethane of the outer layer 26 with the polyol constituent of the rapidly reacting composition 42. Therefore, the rapidly reacting composition 42 generally should be sprayed within six minutes, and preferably within two to four minutes, of completing the application of the water-dispersed composition 36 to the first mold surface 34. Significant delays in spraying the rapidly reacting composition 42 also can cause the outer layer 26 to constrict and delaminate from the first mold surface 34. As a consequence of delamination, the outer layer 26 will not have a shape that complements the configuration of the first mold surface 34, and the entire composite 24 will have to be disposed of as scrap.

On the other hand, if the thermoplastic polyurethane of the water-dispersed composition 36 is not given sufficient time to crosslink before the rapidly reacting composition 42 is sprayed thereon, the polyol component of the rapidly reacting composition 42 can undergo a condensation reaction with unreacted hydroxyl and/or carboxyl pendent functional groups of the polyurethane of the outer layer 26 to form ester or ether linkages, respectively. While some formation of these linkages can advantageously enhance the interfacial chemical bond, the condensation reactions release water, which in excess amounts can act as a blowing agent and undesirably increase the cellularity of the inner layer 28 and interfere with the interfacial chemical bond.

The interfacial chemical bond is further enhanced by separately storing the highly reactive polyol and aromatic polyisocyanate constituent components of the rapidly reacting composition 42 in separate storage chambers and spraying these components on the inner surface 26b of the outer layer 26 so as to avoid contact between these components until spraying is conducted. A suitable dual nozzle spraying mechanism for accomplishing this task is disclosed in U.S. Pat. Nos. 5,028,006 and 5,071,683. By keeping these components separate until immediately prior to spraying, a portion of the polyol reacts with the heat-activated aliphatic diisocyanate (and the hydroxyl and/or carboxyl pendent functional groups of the thermoplastic polyurethane) before all of the polyol can completely react with the polyisocyanate.

Furthermore, given the hygroscopic nature of the aromatic polyisocyanate constituent of the rapidly reacting composition 42, it is important that the outer layer 26 and the surrounding atmosphere (e.g., humidity levels) be substantially dry during this spraying step in order to obtain a strong interfacial chemical bond. While small amounts of moisture may be retained in the outer layer 26, the concentration of such moisture should not be so great as to permit the water to substantially interfere with the reaction between the polyol and polyisocyanate constituents of the rapidly reacting composition 42. Undesirable reactions between the water and the polyisocyanate can disrupt the stoichiometric balance between the polyol and the polyisocyanate, leaving localized unreacted polyol deposits behind on the layered composite structure 24. The water also can serve as a blowing agent, reacting with the polyisocyanate to release carbon dioxide which imparts a cellular structure to the inner layer 28. Excess amounts of water also can deleteriously interfere with the crosslinking reaction effected via the polyol and the residual reactive sites of the blocked, heat-activated aliphatic diisocyanate.

The rapidly reacting composition 42 is preferably applied to the inner surface 26a of the outer layer 26 at an elevated temperature to advance these objectives. Suitable temperatures to which the first mold component 32 can be heated range, by way of example and without limitation, from about 60° C. (140° F.) to about 71.1° C. (160° F.).

Generally, the inner layer 28 can have a thickness in a range of from about 0.10 cm to about 0.15 cm (that is, from about 40 mils to about 60 mils; or from about 0.040 inch to about 0.060 inch).

FIG. 7 illustrates the next step of the present invention. As shown in FIG. 7, the layered composite structure 24 is demolded (i.e., removed) from the first mold surface 34. Such demolding can take place at a mold temperature of, for example, about 60° C. (about 140° F.). Demolding the aromatic-based elastomer is a much less labor intensive, tedious, and time consuming task than demolding the aliphatic-based elastomer. Formation of tears in or undue stretching of the layered composite structure 24 during demolding, which can irreversibly ruin and thereby necessitate disposal of the layered composite structure 24 as scrap, is much less likely to occur with the aromatic-based elastomer. Such demolding problems and inefficiencies are largely overcome by practice of the present invention, since the aromatic-based elastomer has advantageous physical properties and since the interfacial chemical bond between the outer layer 26 and inner layer 28 strengthens the layered composite structure 24 by discouraging separation of the outer and inner layer 26 and 28 during demolding procedures.

To enhance the releasibility from the first mold surface 34 further, the mold surface 34 can be pretreated with a releasing agent. Exemplary releasing agents include, without limitation, high molecular weight microcrystalline wax mold releases, such as Chem-Trend PRC 7140, supplied by Chem-Trend, Inc. of Howell, Mich., or PRC 2006, also supplied by Chem-Trend. These mold releasing agents dry quickly on a heated mold within about 5 to about 10 seconds and form a release barrier between the grained mold surface 34 and the outer layer 26. Care should be taken to avoid the accumulation of the mold releasing agent on the first mold surface 34 or excess solids content in the agent, since such accumulation or excess solids content tends to fill the interstices of the decorative, grained mold surface 34, thereby removing from the exterior surface of the panel structure 10 the appearance of the intricate, hair-like grained configuration of the mold surface 34. Further, the use of excess mold releasing agents can cause the agents to transfer from the first mold surface 34 to the layered composite structure 24 during demolding of the composite structure 24, thus requiring additional wash-removal and drying steps after demolding and hence a loss in productivity.

After being demolded from the first mold surface 34, the layered composite structure 24, including the combination of the outer and inner layers 26 and 28, can be examined for defects with a light source (not shown) while the layered composite structure 24 is positioned on a transparent substrate (not shown). Such defects usually are present as cosmetic blemishes in the outer layer 26, and may include the presence of tears and rupturable portions lacking sufficient thicknesses to withstand stresses associated with demolding or the further processing steps, especially the uniting step. If minor and isolated, such localized defects can be remedied by post application of additional water-dispersed composition 36 onto the backside 28b of the inner layer 28. Additionally, minor tears or thin areas can be repaired using thermoplastic, heat formable polyurethane tape on the backside 28b of the layered composite structure 24. Advantageously, the need to scrap the entire layered composite structure 24 is thereby averted. As a cautionary note, however, post application spray repair of surface 26a is generally undesirable and its use should be minimized to correcting localized minor defects, since post application spray repair can negate the grained leather-like appearance of the outer surface 26a of the outer layer 26 which is copied from the first mold surface 34.

As discussed in further detail below, the steps of demolding and examining of the layered composite structure 24 from the first mold surface 34 are not required to be conducted immediately subsequent to the formation of the layered composite structure 24. For example, the layered composite structure 24 optionally can be maintained against the first mold surface 34 until completion of the panel structure 10.

Figure 8:
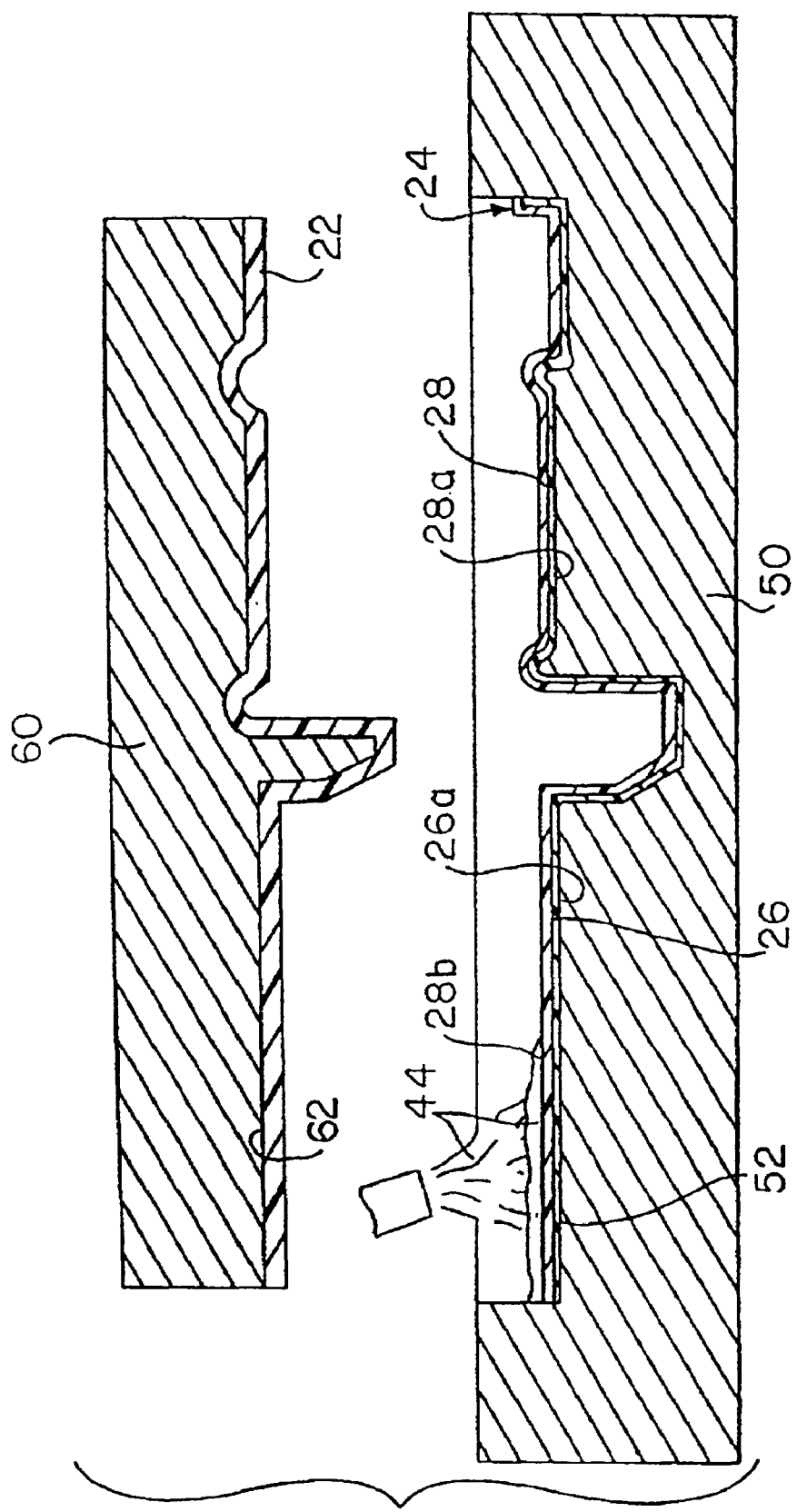
FIG. 8 is a sectional view of a second mold surface showing a step of obtaining a relatively rigid polyurethane cellular foam intermediate layer by applying a reaction mixture to the layered composite structure while disposed on a second mold surface.

After the layered composite structure 24 is demolded from the first mold surface 34 and examined, the layered composite structure 24 is placed on a second mold surface 52 of a second mold part 50. As shown in FIG. 8, the second mold surface 52 also is shaped to define a complementary configuration to the outer layer 26. Then, a reactive mixture 44 for forming a semi-rigid cellular foam, such as a polyurethane semi-rigid cellular foam, is applied to an inner surface 28b of the inner layer 28 while the composite structure 24 is disposed on the second mold surface 52 to form the intermediate layer 30. The reactive mixture 44 can be applied, for instance, by employing high pressure impingement mixing and a mix-head nozzle. The second mold component 50 is generally heated to a temperature in a range of from about 35° C. to about 45° C., and more preferably in a range of from about 35° C. to about 40° C., during application of the reactive mixture. The mixture 44, which is typically relatively viscous, is in a transient state of reaction during application to the second mold component 50 and begins to foam within seconds of application.

Although the desired thickness of the intermediate layer is partially dependent upon the intended use of the panel structure 10, generally the intermediate layer can have a thickness in a range of from about 5 mm to about 12 mm.

Figure 9:
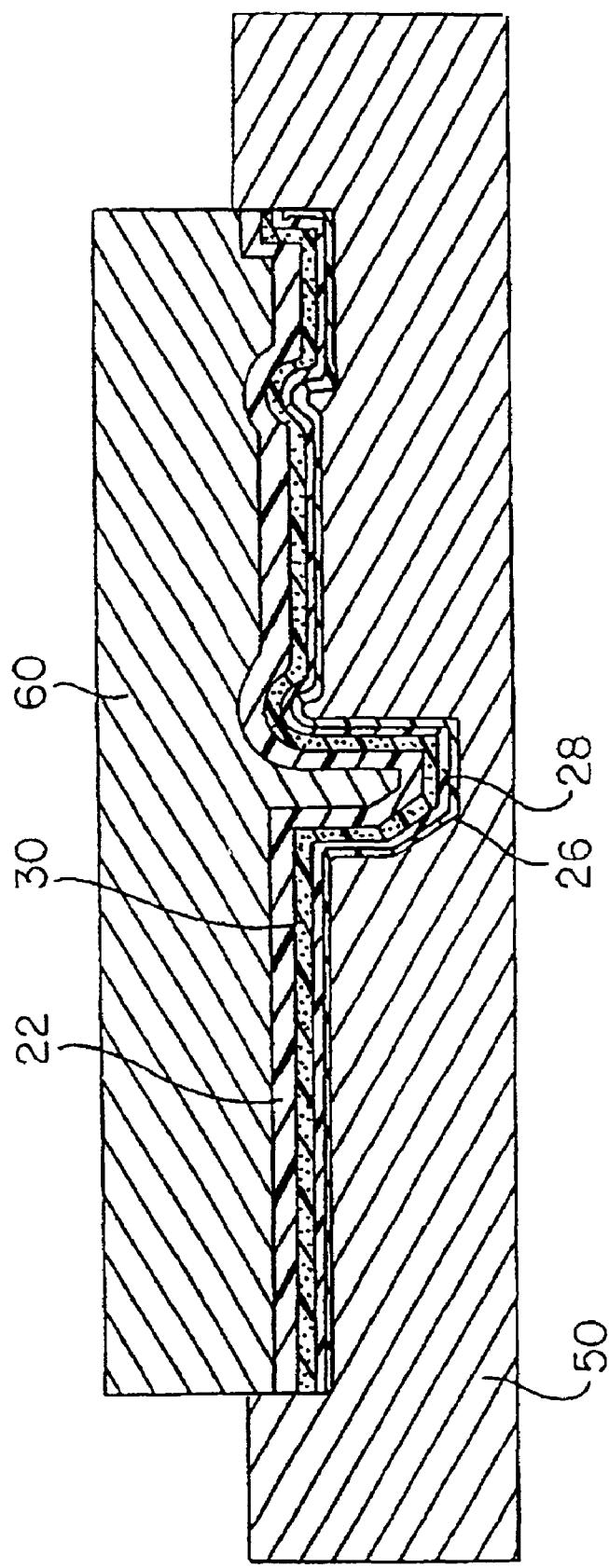
FIG. 9 is a sectional view showing a step of uniting the layered composite structure on the second mold surface with a pre-formed substrate disposed on a third mold surface.

Once the reactive mixture 44 has been applied to the layered composite structure 24 located on the second mold surface 52, a third cooperating mold part or component 60 carrying the pre-formed rigid substrate 22 is moved into cooperating relation with the second mold component 50, as shown in FIG. 9. The third mold component 60 has a third mold surface 62 (FIG. 8) which is shaped to define the interior surface 10b of the panel structure 10. Thereafter, the reactive mixture 44 is foamed and cured, preferably under heat of approximately 43.3° C. (110° F.) and a self-generated cavity pressure of about 0.8 atm to form the intermediate layer 30. The semi-rigid polyurethane cellular foam serves to unite the layered composite structure 24 with the pre-formed substrate 22 disposed on a third mold surface 62. The panel structure including the combination of the layered composite structure 24, the substrate 22, and the intermediate layer 30 then can be removed from the mold parts 50 and 60 and additional components, such as the rug section 20, can be affixed.

In its broadest aspects, several variations and modifications to the above-discussed article can be implemented without departing from the scope of the present invention.

For example, the layered composite structure 24 and/or the intermediate layer 30 can be eliminated from the hidden lower planar rug receiving portion 18 (or other portions that are hidden from the vehicle interior when the panel structure is mounted in the automobile vehicle) of the resultant panel structure 10 depicted in FIG. 1. The lower planar rug receiving portion 18 is thereby characterized by having the rigid substrate 22 and optionally the intermediate layer 30 directly adjacent to the rug section 20.

According to another variant embodiment of the present invention, a non-foamable adhesive can be selected for uniting the layered composite structure 24 to the reinforcing substrate 22.

In accordance with yet another variant embodiment, multiple water-dispersed compositions containing different coloring agents can be respectively applied to different portions of the panel structure to produce discretely masked colors. Where the selected color or colors are to be changed, in practice it has been found that minimal downtime (on the order of about 0.5 hours) is common.

In accordance with still another variant embodiment, the outer layer 26 can exhibit a dualtone or multitone appearance. This variant embodiment can be accomplished, for example, by abrasive treatment of a portion of the mold surface of the tooling. The greater the amount of abrasive treatment, the duller the appearance of the outer layer 26. A dualtone appearance can be especially desirable for instrument panels, since the upper region of an instrument panel generally should have a low gloss in order to reduce reflectance and veiling glare.

Several variations and modifications to the above-discussed method also can be practiced without departing from the scope of the present invention. For example, as mentioned above, the layered composite structure 24 can be retained in the first mold component 32 instead of being demolded and transferred to a second mold component 50 for the uniting step. In accordance with another variant embodiment of the present invention, the layered composite structure 24 can be returned to the first mold component 32 after being examined and treated.

In accordance with another variant of the present invention, a secondary or alternative heat source can be applied for activating the reaction between the light-stable aliphatic thermoplastic polyurethane and the blocked, heat-activated aliphatic diisocyanate. For example, the water-dispersed composition 36 can be preheated before being applied to the first mold surface 34, such that the first mold surface 34 does not have to be heated to initiate the reaction between the heat-activated aliphatic diisocyanate and the light-stable aliphatic thermoplastic polyurethane.

In accordance with yet another variant embodiment of the present invention, the reactive mixture 44 for forming the polyurethane semi-rigid cellular foam 30 can be applied to the surface of the substrate 22 instead of the layered composite structure 24. Alternatively, the second and third mold components 50 and 60 can be cooperatively engaged to define a cavity between the inner surface 28b of the inner layer 28 and the outer surface of the substrate 22, with the reactive mixture 44 thereafter being injected between the rigid substrate 22 and the composite 24.

In order to further elucidate the decorative automotive interior trim article and method of the present invention, the following discussion specifies suitable and preferred constituents and conditions for making the article of the present invention and for carrying out the process of the present invention.

The water-dispersed composition 36 used to prepare the outer layer 26 comprises at least one light-stable aliphatic thermoplastic polyurethane, at least one desired coloring agent, and at least one blocked, heat-activated aliphatic diisocyanate. The light-stable aliphatic thermoplastic polyurethane is preferably prepared from a high molecular weight aliphatic thermoplastic polyurethane containing hydroxyl and/or carboxyl pendent functional groups which are chemically reactive with the blocked, heat-activated aliphatic diisocyanate. The average molecular weight of the thermoplastic polyurethane preferably is in a range of from about 5000 to about 7000, and more preferably about 6000. An exemplary water-dispersed composition containing a thermoplastic polyurethane and blocked, heat-activated aliphatic diisocyanate can be obtained from Titan Finishes Corp. of Detroit, Mich. under the trade designation PROTOTHANE WR, WATER BASED IN-MOLD COATING. The aliphatic diisocyanate may be cyclic or non-cyclic, but should be light stable. As referred to herein, diisocyanates also encompasses prepolymers having two —NCO groups which are reactive with the thermoplastic polyurethane. An exemplary aliphatic diisocyanate is hexamethylene diisocyanate (HMI), which is available from Bayer, Rhone Poulenc, and Nippon Polyurethane. The weight ratio of thermoplastic polyurethane to blocked, heat-activated aliphatic diisocyanate is about 8 to 1 by volume, although this ratio can vary some due to the selection of the thermoplastic polyurethane and diisocyanate.

The water-dispersed composition 36 can be prepared by providing thermoplastic polyurethane component as a colloidal solution in a solvent such as N-methyl pyrrolidone, then dispersing the solution by adding water, the coloring agent, and conventional additives, if desired. Sufficient water (about 61.1% by weight) can be added so that the solvent concentration in the water-dispersed composition 36 is about 8.1% by weight before drying.

The optional additives in the water-dispersed composition 36 can include, without limitation, any combination of the following: heat and ultra-violet light stabilizers, pH stabilizers to maintain an alkaline state of dispersion, plasticizers, antioxidants, dulling agents, surfactants, colloidal protectants to maintain particles in suspension, carbon black, thixotropic agents (e.g., hydroxy methyl cellulose), and fillers such as clay particles.

The water-dispersed composition 36 can contain, for example, about 25% to about 35% solids by weight, and more preferably about 29% solids by weight, about 10% to about 80% water by weight, and more preferably about 61% water by weight, and about 6% to 10% solvents by weight, depending on desired color and additives. An insufficient amount of water in the composition 36 can adversely affect the viscosity of the composition 36 and thus adversely affect the application of the water-dispersed composition 36 onto the mold surface 34. On the other hand, an excess amount of water in the composition 36 can significantly alter the sprayability and coating efficiency of the water-dispersed composition 36 to prolong the time needed to dry the outer layer 26.

To the thermoplastic polyurethane solution is added a solution of the blocked, heat-activated aliphatic diisocyanate, which can include as a solvent, for example, 1-methyl-2-pyrrolidine and/or 4-hydroxy-4-methyl-2-pentanone. A discussion of blocked isocyanates is included in Practical Chemistry of Polyurethanes and Diisocyanates, Akron Polymer Laboratories, David Russell (1991), the complete disclosure of which is incorporated herein by reference. The blocked, heat-activated aliphatic diisocyanate is preferably maintained at room temperature and protected from heat until use. When influenced by the heat, such as the heat of the tooling during spraying application, the blocked, heat-activated aliphatic diisocyanate reacts with the hydroxyl and/or carboxyl groups of the thermoplastic polyurethane to crosslink the thermoplastic polyurethane with itself or with polyol constituents of the rapidly reacting composition 42.

Exemplary polyisocyanates that can be selected for the rapidly reacting composition 42 employed to prepare the inner layer 28 include diisocyanates having aromatic closed-ring structures, such as diphenylmethane diisocyanate prepolymer (MDI prepolymer), which can be obtained from BASF Corp. of Wyandotte, Mich. under the trade designation ELASTOLIT M50555T, ISOCYANATE, NPU U05275, or diphenylmethane-4,4'-diisocyanate (MDI), or mixed isomers of MDI or mixtures of the above, which are available from BASF or Dow Chemical Corp. of Midland, Mich., Mobay (Bayer) Chemical Corp. of Baytown, Tex., or ICI America of Geismar, La. The above-mentioned non-light-stable aromatic polyisocyanates are very desirable for use in the inner layer in view of the higher rate of reactivity and completion of property development and better physical properties (e.g., tensile strength, elongation, and tear strength) of these non-light-stable aromatic polyisocyanate when compared to light-stable aliphatic-based isocyanates such as isophorone diisocyanates, in which the —NCO groups are sterically hindered due to their spatial arrangement at either end of the molecule. By contrast, the aromatic diisocyanates used in this invention preferably have —NCO groups directly attached to the aromatic ring. In this preferred embodiment, the aromatic diisocyanates yield faster rates of reaction because of the arrangement and reactivity of the —NCO groups on the aromatic ring structure (e.g., in diphenylmethane diisocyanate) and the availability of the —NCO groups for reaction with the hydrogen donors of the —OH type residing on the organic chain of the polyols of the rapidly reacting composition 42.

Suitable polyols for this rapidly reacting composition 42 include, without limitation, polyether polyols having average molecular weights in a range of from about 200 to about 2000 and containing one or more pendent hydroxyl and/or carboxyl groups in addition to primary hydroxyl groups, which can chemically react with unreacted functional —NCO groups of the blocked, heat-activated aliphatic diisocyanate and the hydroxyl and/or carboxyl pendent functional groups of the polyurethane of the outer layer 26. An exemplary polyol is ELASTOLIT M50555R NPU U05274 from BASF Corp. of Wyandotte, Mich.

The rapidly reacting composition 42 can also contain appropriate additives, including, by way of example and without limitation, any combination of the following: heat and ultra-violet light stabilizers, pH stabilizers, antioxidants, dulling agents, surfactants, carbon black, chain extenders (e.g., ethylene glycol), thixotropic agents (e.g., amorphous silica), fillers such as clay particles, and catalysts such as tin catalysts (e.g., dibutyltin dilaurate).

Various blends of polyether polyols and polyisocyanates having suitable resilience properties can be employed to form the semi-rigid polyurethane cellular foam of the intermediate layer 30. For example, the polyisocyanate blend can include methylene diisocyanate. The semi-rigid polyurethane cellular foam also can contain appropriate additives, including, by way of example and without limitation, any combination of the following: surfactants, antioxidants, fillers, stabilizers, catalysts such as tin catalysts (e.g., dibutyl tin dilaurate) and amines (e.g., diethanolamine), and small amounts of foaming agents such as water. In this regard, it is noted that the condensation reaction between the blends of polyols and polycyanates releases water, which reacts with the polyisocyanate to generate carbon dioxide and thereby impart the cellular structure to the intermediate layer 30. Accordingly, a slightly stoichiometric excess of polyol can be provided to form the semi-rigid polyurethane cellular foam.

The rigid substrate 22 can be selected from any material possessing the requisite strength to reinforce and mount the outer layer 26, inner layer 28, and intermediate layer 30. Suitable materials include polyolefins, such as polypropylene and ethylene-propylene copolymers, thermoplastic olefins (TPOs), and thermoplastic polyolefin elastomers (TPEs). In some instances where even higher levels of performance are required, engineering thermoplastics may be selected. These include injection molding thermoplastics, such as acrylonitrile butadiene styrene (ABS), polycarbonate (PC), a PC/ABS alloy, thermoplastic polyurethane (TPU), styrene maleic anhydride (SMA), and reaction injection molded polyurethanes (RRIM). Other materials, such as metals, metal alloys, wood-fiber composites, or any combination thereof, can also be used.

The reinforcing substrate 22 can optionally also include reinforcement nanoparticles comprising platelet minerals dispersed in the desired polymer in desired ratios. The components can be blended by general techniques known to those skilled in the art. For example, the components can be blended and then melted in mixers or extruders.

Additional specific methods for forming a polymer composite having dispersed therein exfoliated layered particles are disclosed in U.S. Pat. Nos. 5,717,000, 5,747,560, 5,698,624, and WO 93/11190, each of which is hereby incorporated by reference. For additional background the following are also incorporated by reference: U.S. Pat. Nos. 4,739,007 and 5,652,284.

Figure 2:
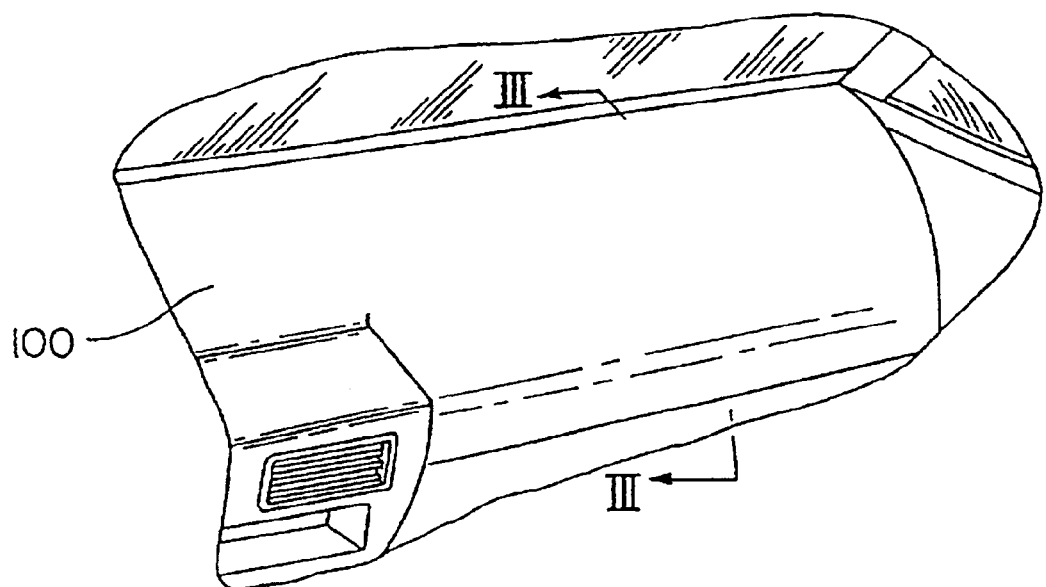
FIG. 2 is a perspective view of a completed vehicle instrument panel constructed in accordance with the present invention.
Figure 3:
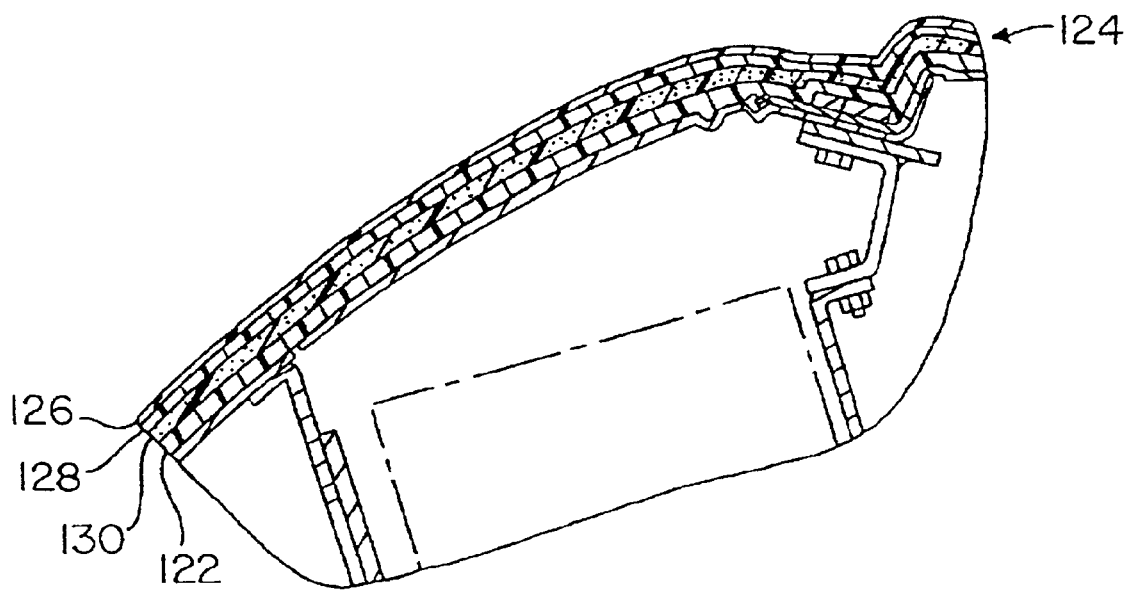
FIG. 3 is a sectional view of the instrument panel of FIG. 2 taken along line III—III.

Although the method of the present invention has been embodied above in connection with the preparation of a door panel, it is understood that the method is equally applicable to other panel structures, including for example instrument panels, armrests, headrests, floor consoles, knee bolsters, and glove compartment doors. An instrument panel prepared in accordance with the method of the present invention is illustrated in perspective and cross-sectional views in FIGS. 2 and 3, respectively, and is generally designated by reference numeral 100. The instrument panel 100 is shown in cross-section in FIG. 3, and includes a substrate 122, an outer layer 126 and an inner layer 128 (collectively a layered composite structure, generally designated by reference numeral 124), and an intermediate layer 130.

The complete disclosures of any United States or foreign patents or patent applications mentioned or cited hereinabove are hereby incorporated by reference into the present specification.

The following non-limiting example is presented for the purpose of further illustration of this invention:

EXAMPLE

A microlayer coating of a crystalline wax mold release agent (Chem-Trend PRC 7140 with naphtha (petroleum naphtha) solvent under stirring) containing 2% solids was sprayed onto a grained surface of a nickel electroform tooling while the tooling was maintained (throughout the process) at a constant temperature of 60° C. The crystalline wax was allowed to dry over a 15 second period, then was sprayed with catalyzed, color-keyed water-based composition comprising Titan Finishes Corp.'s PROTOTHANE WR, WATER BASED IN-MOLD COATING (containing 61.1 wt % water and 8.1 wt % solvent), hexamethylene diisocyanate from Bayer, and medium dark neutral (or light brown pigmentation) to yield an outer layer having a thickness of about 0.025 mm. The water was then evaporated to leave a contiguous film of coalesced resin particles with some residual solvent. The mold with the outer layer disposed thereon was moved to another station (taking approximately 30 seconds), where a two-part urethane elastomer was sprayed onto the surface of the inner layer. An BLASTOLIT M50555T, ISOCYANATE, NPU U05275 isocyanate with a free —NCO weight percent of 22.6 to 23.2 and ELASTOLIT M50555R NPU U05274 polyol from BASF with an equivalent weight of 350 g/mol and a hydroxyl number of 160 were delivered separately through heated lines at 60° C. using high pressure metering pumps at 1250 psi delivery pressure. The weight ratio of polyol to isocyanate was 1.9:1. A feedback loop controller was used to bring the two components together in a high pressure impingement mixer within a valve controller and thereby combined the two reactive components by passing them through a sequential static mixer and spray orifice that delivers a controlled shape stream of mixed liquid at 20.0 g/sec. A robotic arm served to dispose the discharge from the spray orifice in a controlled and pre-programmed manner (as is known in the art) to coat the outer layer with an inner layer having a thickness of 1.0±0.1 mm of thickness. (After applying the inner layer, the valve controller and spray orifice are flushed with a non-flammable solvent). During the final curing stage, which lasts about 90 seconds, the polyurethane elastomer chemically bonds with the residual reactive sites of the outer layer to form a layered composite structure with interfacial chemical bonding. The layered composite structure is then demolded and inspected.

The foregoing detailed description of the preferred embodiments of the invention has been provided for the purposes of illustration and description. It is not intended to be exhaustive or to limit the invention to the precise embodiments disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated.

What is claimed is:

1. A process for making a layered composite structure, said process comprising:

applying a water-dispersed composition onto a first mold surface, the water-dispersed composition comprising at least one light-stable thermoplastic polyurethane containing at least one pendent functional group selected from the group consisting of hydroxyl and carboxyl functional groups, at least one coloring agent, and at least one light-stable, blocked, heat-activated diisocyanate;

applying sufficient heat to induce partial crosslinking of the light-stable thermoplastic polyurethane with the blocked, heat-activated diisocyanate;

substantially drying the water-dispersed composition while on the first mold surface so as to form an outer layer having an outer surface with a complementary shape to the first mold surface; and spraying a rapidly reacting composition containing at least one aromatic polyisocyanate and at least one polyol onto an inner surface of the outer layer while on the mold surface to form an inner layer which comprises a polyurethane elastomer crosslinked with the polyurethane of the outer layer via residual unreacted functional groups of the blocked, heat-activated diisocyanate and thereby forming the layered composite structure having interfacial chemical bonding between the inner surface of the outer layer and an adjacent surface of the inner layer.

2. A process according to claim 1, wherein the aromatic polyisocyanate is at least one member selected from the group consisting of a diphenylmethane diisocyanate prepolymer and diphenylmethane-4,4'-diisocyanate.

3. A process according to claim 1, wherein the blocked, heat-activated diisocyanate is hexamethylene diisocyanate.

4. A process according to claim 3, wherein the polyol contains one or more pendent hydroxyl, carboxyl, or hydroxyl and carboxyl functional groups.

5. A process according to claim 1, further comprising:

transferring the layered composite structure from the first mold surface to a second mold surface;

providing a reinforcing substrate on a third mold surface having a configuration complementary to an interior surface of a panel structure; and applying a reactive mixture to the layered composite structure while on the second mold surface, arranging the second and third mold surfaces so that the layered composite structure and the reinforcing substrate collectively define a mold cavity for receiving the reactive mixture, foaming the reactive mixture to form a relatively reinforcing polyurethane cellular foam that unites the reinforcing substrate to the layered composite structure.

6. A process according to claim 1, further comprising:

transferring the layered composite structure from the first mold surface to a transparent surface of a holding platform;

detecting and reinforcing rupturable portions of the layered composite structure;

transferring the layered composite structure from the transparent surface to a second mold surface;

providing a reinforcing substrate on a third mold surface; and applying a reactive mixture to the layered composite structure while on the second mold surface, arranging the second and third mold surfaces so that the layered composite structure and the reinforcing substrate collectively define a mold cavity for receiving the reactive mixture, foaming the reactive mixture to form a relatively rigid polyurethane cellular foam that unites the reinforcing substrate to the layered composite structure.

7. A process according to claim 1, wherein said drying is performed by evaporating the water from the water-dispersed composition.

8. A process according to claim 1, wherein the outer layer has a thickness in a range of from about 0.0025 cm to about 0.0038 cm.

9. A process according to claim 1, wherein the inner layer has a thickness in a range of from about 0.10 cm to about 0.15 cm.

10. A process according to claim 1, further comprising the step of precoating the first mold surface with a microcrystalline wax mold releasing agent.

11. A process according to claim 1, wherein the first mold surface is heated during said spraying.

12. A process according to claim 1, wherein the first mold surface is shaped to define a complementary configuration to an exterior surface of a door panel.

13. A process according to claim 1, wherein the first mold surface is shaped to define a complementary configuration to an exterior surface of an instrument panel.

14. A process for making a layered composite structure, said process comprising:

precoating a microcrystalline wax mold releasing agent on a first mold surface, the first mold surface being heated to a first elevated temperature to melt and disperse the microcrystalline wax mold releasing agent;

applying a water-dispersed composition onto the first mold surface, the water-dispersed composition comprising at least one light-stable aliphatic thermoplastic polyurethane containing at least one pendent functional group selected from the group consisting of hydroxyl and carboxyl functional groups, at least one desired coloring agent, and at least one light-stable, blocked, heat-activated diisocyanate;

heating the first mold surface at a second elevated temperature during said step of applying a water-dispersed composition to thereby induce partial crosslinking of the light-stable aliphatic thermoplastic polyurethane with the blocked, heat-activated diisocyanate;

substantially drying the water-dispersed composition while on the first mold surface by heating the first mold surface to a third elevated temperature to form an outer layer having an outer surface complementary in configuration to the first mold surface; and spraying a rapidly reacting composition containing at least one aromatic polyisocyanate and at least one polyol onto an inner surface of the outer layer while on the first mold surface heated at a fourth elevated temperature to form an inner layer which comprises a polyurethane elastomer crosslinked with the polyurethane of the outer layer via residual unreacted functional groups of the blocked, heat-activated diisocyanate and thereby forming the layered composite structure having interfacial chemical bonding between the inner surface of the outer layer and an adjacent surface of the inner layer.

15. A process according to claim 14, wherein the aromatic polyisocyanate is at least one member selected from the group consisting of diphenylmethane diisocyanate prepolymer and diphenylmethane-4,4'-diisocyanate.

16. A process according to claim 14, wherein the blocked, heat-activated diisocyanate is hexamethylene diisocyanate.

17. A process according to claim 16, wherein the one polyol contains one or more pendent hydroxyl, carboxyl, or hydroxyl and carboxyl functional groups.

18. A process according to claim 14, wherein the first elevated temperature, second elevated temperature, third elevated temperature, and fourth elevated temperature are all the same and in a range of from about 140° F. to about 160° F.

19. A process according to claim 14, further comprising uniting the layered composite structure with a reinforcing substrate so that the reinforcing substrate reinforces the outer layer.

* * * * *